(12) United States Patent
Ming-Hui et al.

(10) Patent No.: US 6,654,335 B2
(45) Date of Patent: Nov. 25, 2003

(54) OPTICAL DRIVE LOADER WITH A MANUAL DISK EJECTING MECHANISM

(75) Inventors: Chen Ming-Hui, Taipei Hsien (TW); Ming-Shiung Chang, Taipei Hsien (TW)

(73) Assignee: Acer Inc. (TW)

(*) Notice: Subject to any disclaimer, the term of this patent is extended or adjusted under 35 U.S.C. 154(b) by 133 days.

(21) Appl. No.: 09/972,045

(22) Filed: Oct. 9, 2001

(65) Prior Publication Data
US 2003/0002421 A1 Jan. 2, 2003

(30) Foreign Application Priority Data
Jun. 29, 2001 (CN) ......................................... 90210992 U

(51) Int. Cl.⁷ .............................................. G11B 17/04
(52) U.S. Cl. ................................. 369/77.2; 360/99.02
(58) Field of Search ............................. 369/77.1, 75.2, 369/77.2; 360/99.02, 99.03, 99.06, 99.07

(56) References Cited

U.S. PATENT DOCUMENTS

| 4,945,433 A | * 7/1990 | Suzuki et al. ............. 360/99.07 |
| 5,532,996 A | * 7/1996 | Okabe et al. ............... 369/77.2 |
| 5,883,755 A | * 3/1999 | Vollmann ................... 360/96.5 |
| 6,005,833 A | * 12/1999 | Yasuma et al. ............. 369/75.2 |
| 6,058,090 A | * 5/2000 | Wang et al. ................ 369/77.1 |
| 6,275,459 B1 | * 8/2001 | Obata et al. ................ 369/75.2 |
| 6,339,575 B1 | * 1/2002 | Suzuki ....................... 369/77.1 |
| 6,426,932 B2 | * 7/2002 | Omori et al. ............... 369/75.1 |

FOREIGN PATENT DOCUMENTS

JP 3-216854 * 9/1991

* cited by examiner

Primary Examiner—Brian E. Miller
(74) Attorney, Agent, or Firm—Michael D. Bednarek; Shaw Pittman LLP

(57) ABSTRACT

The invention presents an optical drive loader with a manual disk ejecting mechanism comprising a frame, a disk receiving apparatus, a speed reduction apparatus, a driving apparatus, and a disk ejecting actuating part. Relying on the disk ejecting actuating part positioned on the frame, which is provided with a gear portion for driving the speed reduction apparatus and a roll stem portion positioned at the center of the gear portion extruding along the central axis, users can use a tool going through a through hole of the housing turning the roll stem portion to rotate the gear portion and enable the speed reduction apparatus to move the disk receiving apparatus to the feeding/ejecting position. A through hole is disposed on the housing corresponding to the roll stem portion, so as to avoid the through hole being disposed on the operation panel to affect the appearance of the operation panel.

8 Claims, 3 Drawing Sheets

OPTICAL DRIVE LOADER WITH A MANUAL DISK EJECTING MECHANISM

BACKGROUND OF THE INVENTION

1. Field of the Invention

The present invention relates to an optical drive loader with a manual disk ejecting mechanism, particularly to a CD player loader which offers a manual disk ejecting mechanism when the electronic controlled disk ejecting mechanism does not operate normally or fails to function.

2. Description of the Prior Art

Hitherto, an optical storage medium has been known in which the feeding and ejecting mechanism of a CD player can be categorized into two types, one the tray-in type and the other is the slot-in type. In the conventional optical storage medium, a CD player typically uses an integrated circuit (IC) operated by electronic power to control the servo-motor for driving the feeding/ejecting mechanism. Thus, it is evident from the above description that a conventional optical storage medium requires electronic power for operating the feeding and ejecting mechanism of a CD player. However, the design of electronic operation results in the fact that a compact disk is held inside the CD player when an emergency occurs such as that power is suddenly shut down due to a power failure, thereby reducing the operation efficiency and increasing maintenance cost.

Accordingly, there is a need for a manual disk mechanism for an optical medium wherein manual control is available for the functions of feeding and ejecting of a CD player, thereby enhancing the operation efficiency and reducing maintenance cost.

SUMMARY OF THE INVENTION

A primary object of the invention is to present an optical drive loader with a manual disk ejecting mechanism which does not affect the appearance of the operation panel and does not require dismantling of the housing for ejecting a disk so as to make it simple to be used.

The optical drive loader with a manual disk ejecting mechanism according to the present invention includes a frame, a disk receiving apparatus, a speed reduction apparatus, a driving apparatus, and a disk ejecting actuating part. Relying on the disk ejecting actuating part positioned on the frame, which is provided with a gear portion for driving the speed reduction apparatus and a roll stem portion positioned at the center of the gear portion extruding along the central axis.

When the driving apparatus does not operate normally or fails to function, users can use a tool going through a through hole of the housing turning the roll stem portion to rotate the gear portion and enable the speed reduction apparatus to move the disk receiving apparatus to the feeding/ejecting position. A through hole is disposed on the housing corresponding to the roll stem portion, so as to avoid the through hole being disposed on the operation panel to affect the appearance of the operation panel. Also, users are allowed to stick a tool going through the through hole for turning the disk ejecting actuating part so as to achieve the effect that it is not necessary to dismantle the housing for ejecting the disk manually.

BRIEF DESCRIPTION OF THE DRAWINGS

The following detailed description, given by way of an example and not intended to limit the invention to the embodiments described herein, will best be understood in conjunction with the accompanying drawings, in which.

DETAILED DESCRIPTION OF THE PREFERRED EMBODIMENT

Figure 1:
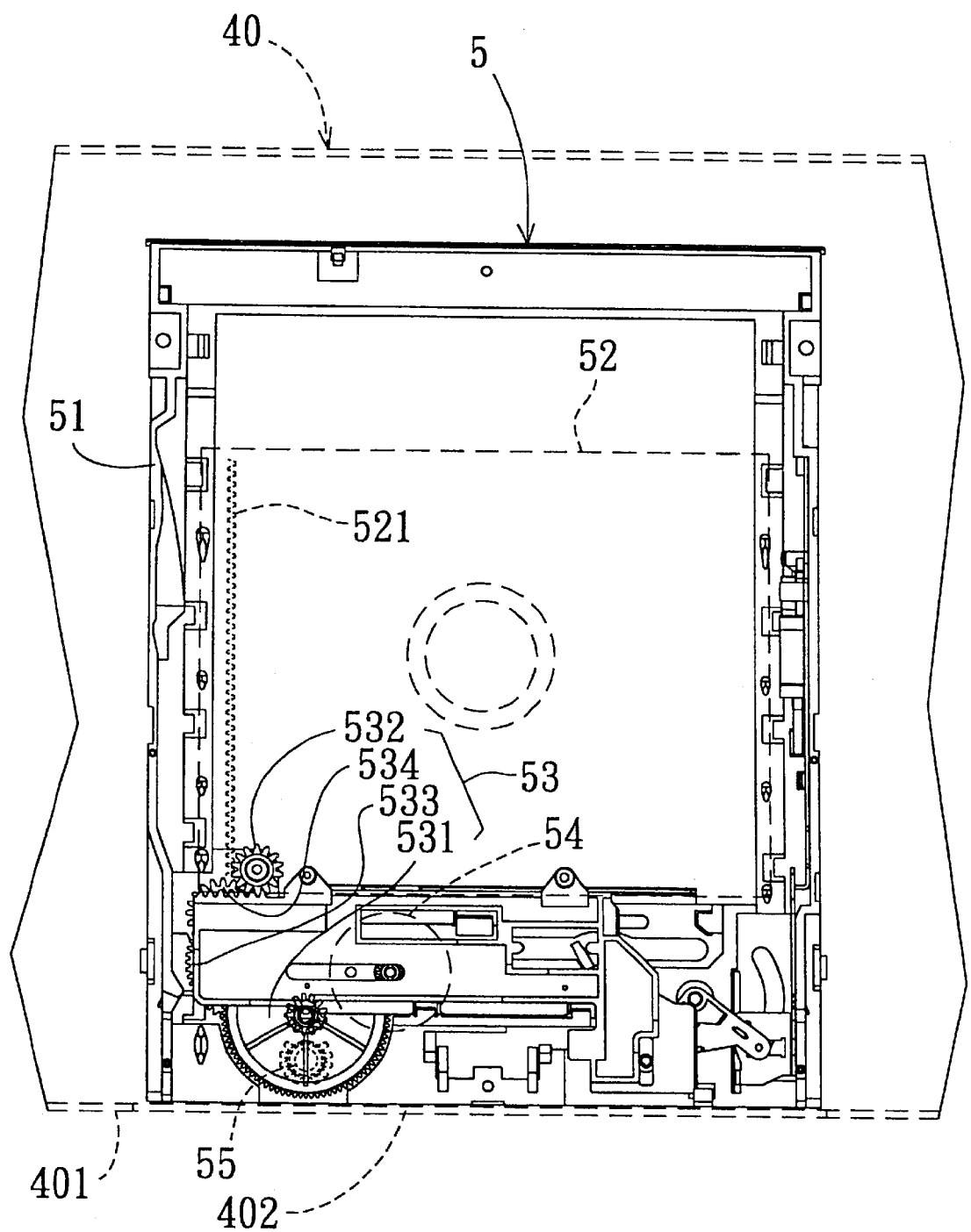
FIG. 1 is a perspective view showing the structure of a preferred embodiment of an optical drive loader having a manual disk ejecting mechanism according to the present invention.

Refers to FIG. 1 showing the structure of a preferred embodiment of a CD player loader 5 having a manual disk ejecting mechanism according to the present invention. The CD player loader 5 is installed in a housing 40 of a CD player. The housing 40 has a panel 401 for users to operate thereon and there is an insertion slot 402 on the panel 401 for feeding/ejecting a compact disk. The loader 5 comprises a frame 51, a disk receiving apparatus 52, a speed reduction apparatus 53, a driving apparatus 54, and a disk ejecting actuating part 55.

The frame 51 is installed in the housing 40 and is shaped in accordance with the whole mechanism design. The disk receiving apparatus 52 may be a slot-in type disk clamping apparatus or a tray-in type. In the preferred embodiment, it is a slot-in type disk clamping apparatus for holding and positioning a compact disk. The slot-in type disk clamping apparatus is slidingly coupled to the frame 51 such that the disk receiving apparatus 52 is movable between the feeding/ejecting position 402, which is close to the insertion slot 402 of the housing 40, and a data reading position, which is far away from the insertion slot 402. A rack 521 is installed on the disk receiving apparatus 52 along the moving direction of the disk receiving apparatus 52.

A speed reduction apparatus 53 is installed on the frame 51 for driving the disk receiving apparatus 52. In the preferred embodiment, the speed reduction apparatus comprises at least a first gear 531, a second gear 532 which is engaged with the rack 521 of the disk receiving apparatus 52 and driven by the first gear 531. In the preferred embodiment, the first gear 531 is formed with a first circular gear portion 5311 on outer edge with more teeth and a second circular gear portion 5312 with less teeth which is coaxial with the first circular gear portion 5311 and extends outward. The first gear 531 transmits the rotation motion to the second gear 532 by means of a first speed reduction gear 533 and a second speed reduction gear 534, which is driven by the first speed reduction gear 533.

The driving apparatus 54 is positioned on the frame 51 for supplying power to the speed reduction apparatus 53. In the preferred embodiment, the driving apparatus 54 is a driving motor, which is used to drive the first gear 531 and then make the second gear 532 to drive the rack 521 of the disk receiving apparatus 52 such that the disk receiving apparatus 52 can move linearly.

Figure 2:
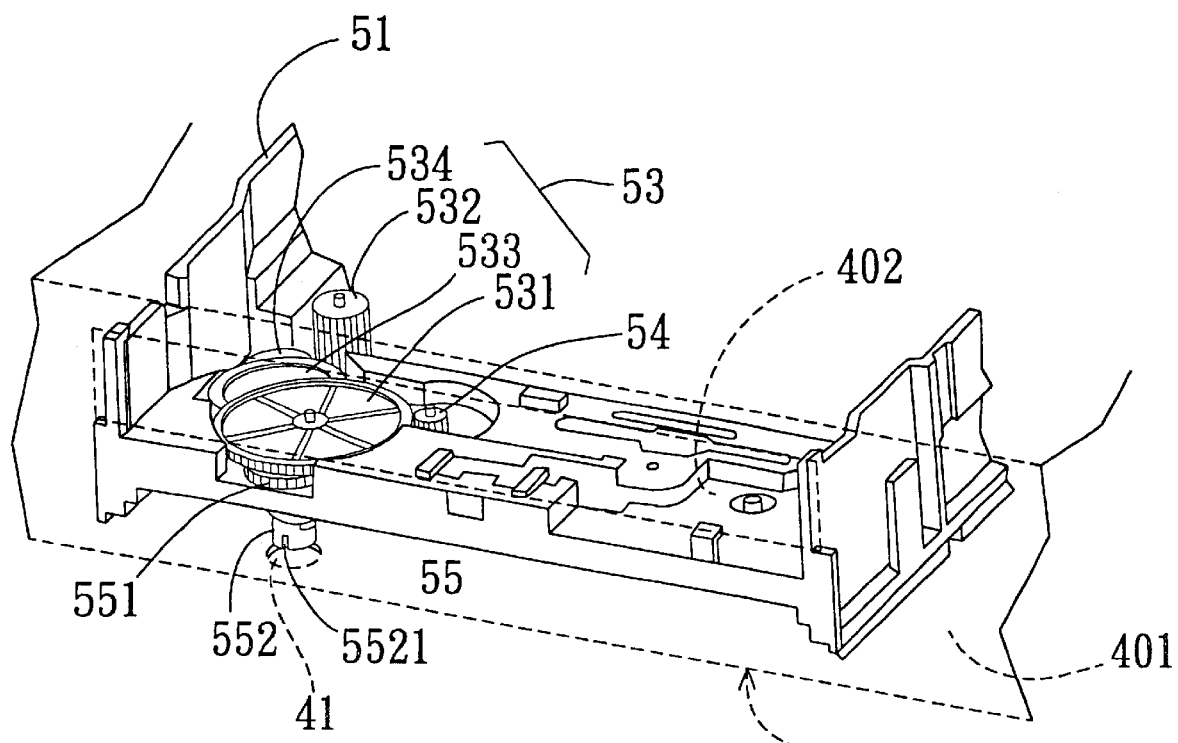
FIG. 2 is a perspective view showing of a partial structure of the preferred embodiment illustrating the relationship between the positions of the disk ejecting actuating part and the speed reduction apparatus.
Figure 3:
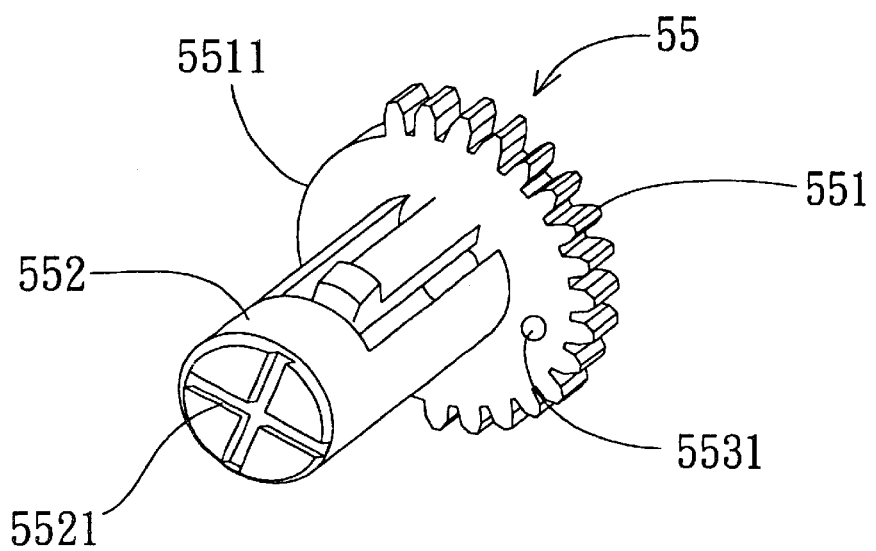
FIG. 3 is a perspective view of the disk ejecting actuating part of the preferred embodiment.
Figure 4:
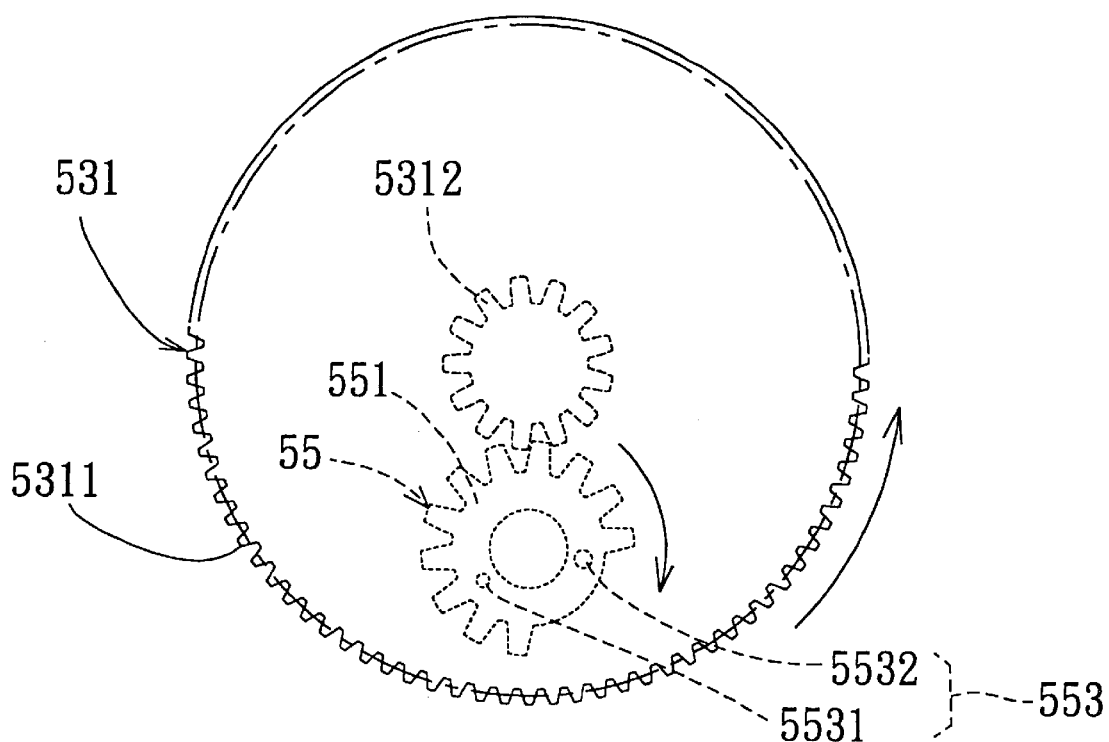
FIG. 4 is a perspective view showing the transmission connection between the disk ejecting actuating part and the first gear of the preferred embodiment.
Figure 5:
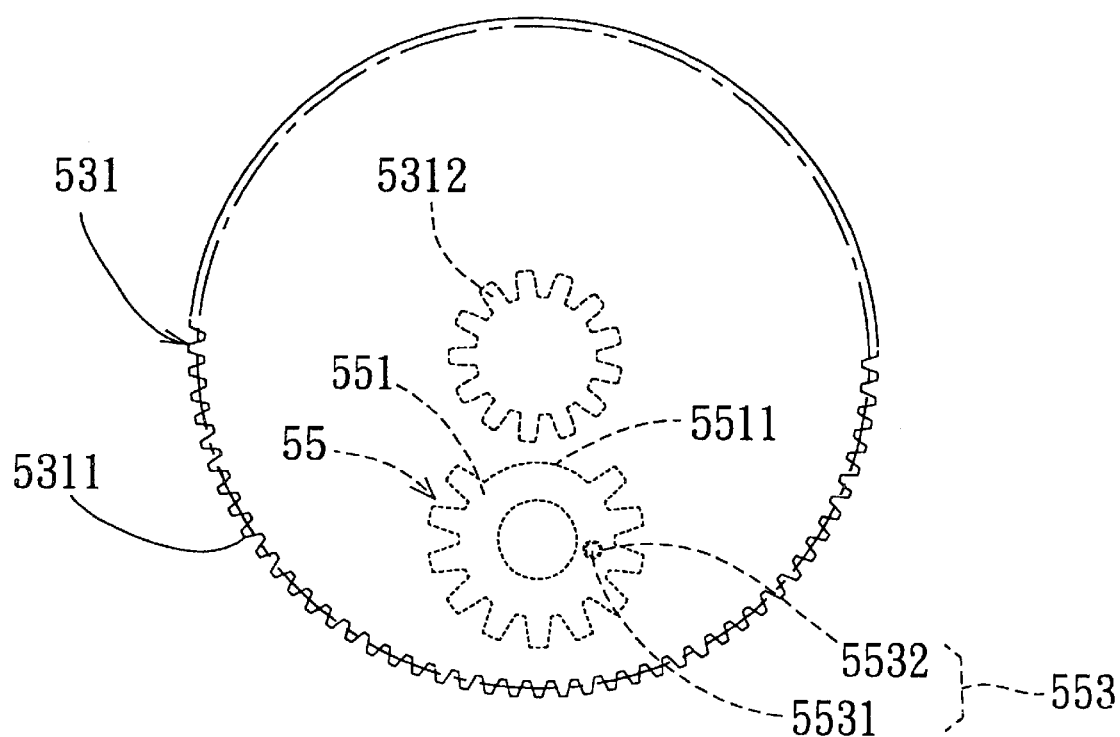
FIG. 5 is a perspective view showing the relation between the positions of the disk ejecting actuating part and the first gear of the preferred embodiment when they are not coupled together.

The disk ejecting actuating part 55 is also positioned on the frame 51 as shown in FIG. 2. In the preferred embodiment, the disk ejecting actuating part 55 is positioned under the first gear 531 for cooperating to the extending direction of the second circular gear portion 5312 of the first gear 531. Referring to FIG. 3 to FIG. 5, the disk ejecting actuating part 55 comprises a gear portion 551 which drives the second circulation portion 5312 of the first gear 531, and a roll stem portion 552 which positions at the center of the gear portion 551 and extrudes outward along the central axis. The roll stem portion 552 is positioned under the frame 51. A proper slot 5521 is formed as shown in FIG. 3, which is a cross slot. A through hole 41 is disposed on the housing 40 corresponding to the roll stem portion 552.

When operating normally, the rotation direction of the driving apparatus 54 is controlled electronically as a conventional CD player is controlled. The rotation speed of the driving apparatus 54 is reduced by means of the speed reduction apparatus 53. The rotation motion is transferred to linear motion by the rack 521 of the disk receiving apparatus 52 so as to move the compact disks held on the disk receiving apparatus 52 forward and backward between the feeding/ejecting position and the data reading position.

When the driving apparatus 54 does not operate normally or fails to function, users may stick a cross screw driver, a flat screw driver, or the like, going through the through hole 41 to couple with the slot 5521 of the roll stem portion 552 and turning the roll stem portion 552 to rotate the gear portion 551. The gear portion 551, instead of the driving apparatus 54 drives the second circular gear portion 5312 of the first gear 531 to move the disk receiving apparatus 52 to the feeding/ejecting position. When the disk receiving apparatus 52 is in feeding/ejecting position, the users then are allowed to remove the compact disk. As a result, without dismantling the housing 40, a compact disk manual ejecting can be easily achieved.

Moreover, because the axis of the disk ejecting actuating part 55 is parallel with the one of the first gear 531, the disk ejecting actuating part 55 is then perpendicular to the moving direction of the disk ejecting receiving apparatus 52 such that the through hole 41 that is provided for cooperating to the roll stem portion 552 of the disk ejecting actuating part 55 is not required to be positioned on the operation panel 401 of the housing 40. The through hole 41 in accordance with the preferred embodiment is positioned on the bottom of the housing 40 so that the appearance of the whole operation panel 401 is not be altered.

When a user executed the manual disk ejecting operation, the user is allowed to stick a tool going through the through hole 41 on the bottom of the housing 40 and turning the disk ejecting actuating part 55 without dismantling the house 40. Further more, the transmission proportion of rotation speed between the gear portion 551 of the disk ejecting actuating part 55 and the second circular portion 5312 of the first gear 531 is minor. In other words, the present invention offers a power saving means for ejecting compact disks and avoids the extra labor required when using a screw rod to eject a disk in the prior art as a result of low transmission rotation speed.

When operating normally, in order to prevent the disk ejecting actuating part 55 and the first gear 531 from being cogged which may generate transmission resistance of the speed reduction apparatus 53 and noise as shown in FIG. 2, a smooth toothless region 5511 is formed on the edge surface of the gear portion 551 of the disk ejecting actuating part 55. At a corresponding position on the frame 51, a positioning pair 553 is disposed on the surface of the gear portion 551 facing the frame 51. In the preferred embodiment, the positioning pair 553 comprises a bump 5531 and a corresponding shallow recession 5532, the bump 5531 is formed on the surface of the gear portion 551 and the shallow recession of 5532 is formed on the frame 51. When the driving apparatus 54 operates normally, the bump 5531 is coupled to the shallow recession 5532, as shown in FIG. 5, to provide an interference force such that the gear portion 551 is rotated to a specific orientation to prevent the toothless portion 5511 and the second circular gear portion 5312 from being cogged.

In summary, the CD player loader 5 with a manual disk ejecting mechanism according to the present invention in which the disk ejecting actuating part 55 has the advantages of simple design, easy operation, low manufacturing cost. The operation is accomplished without dismantling the housing 40 within a short time. The present invention does not alter the appearance of the panel 401 of the housing 40 and as a result substantially enhances the competitiveness of the product in the market.

While the invention has been described with reference to various illustrative embodiments, the description herein should not be construed in a limiting sense. Despite the foregoing detail description relates to CD players, which are taken as a household electronic device; however, the present invention can also apply to a CD-ROM drive used in computers. Various modifications of the illustrative embodiments, as well as other embodiments of the invention, will be apparent to those skilled in the art upon reference to this description. It is therefore contemplated that the appended claims will cover any such modifications or embodiments as may fall within the scope of the invention defined by the following claims and their equivalents.

What is claimed is:

1. An optical drive loader with a manual disk ejecting mechanism installed in the housing of an optical drive, wherein the housing has a panel provided for a user to operate thereon and the panel has an insertion slot provided for feeding/ejecting a disk, said loader comprising:

a frame installed in the housing;

a disk receiving apparatus slidingly coupled to the frame and movable between a feeding/ejecting position close to the insertion slot and a data reading position away from the insertion slot;

a speed reduction apparatus installed on the frame for driving the disk receiving apparatus;

a driving apparatus positioned on the frame for supplying power to the speed reduction apparatus to move the disk receiving apparatus toward the feeding/ejecting position or the data reading position; and a disk ejecting actuating part positioned on the frame, including a gear portion for driving the speed reduction apparatus and a roll stem portion coaxial with the gear portion extruding along the central axis thereof, a through hole disposed on the housing corresponding to the roll stem portion, when the driving apparatus does not operate normally, without dismantling the housing, which the hole is not on the front panel of the housing, the disk is ejected manually via sticking a tool going through the through hole of the housing, turning the roll stem portion to rotate the gear portion and enable the speed reduction apparatus to move the disk receiving apparatus to the feeding/ejection position.

2. The optical drive loader with a manual disk ejecting mechanism as claimed in claim 1, wherein the disk receiving apparatus comprises a rack installed along its moving direction, the speed reduction apparatus comprises at least a first gear and a second gear, the first gear is driven by the driving apparatus, the second gear is driven by the first gear and engaged with the rack, such that the disk receiving apparatus is driven by the driving apparatus.

3. The optical drive loader with a manual disk ejecting mechanism as claimed in claim 2, wherein the gear portion of the disk ejecting actuating part comprises a smooth toothless region formed on the edge surface of the gear portion, when the driving apparatus operates normally, the toothless region is positioned at a specific rotation orientation to prevent the gear portion and the first gear from being cogged.

4. The optical drive loader with a manual disk ejecting mechanism as claimed in claim 3, wherein the disk ejecting actuating part comprises a positioning pair to prevent the gear portion and the first gear from being cogged with the driving apparatus operates normally.

5. The optical drive loader with a manual disk ejecting mechanism as claimed in claim 4, wherein the positioning pair comprises a bump and a corresponding shallow recession, the bump is formed on the surface of the gear portion and the shallow recession is formed on the frame, and the bump coupled to the shallow recession to provide an interference force to prevent the gear portion and the first gear from being cogged.

6. The optical driver loader with a manual disk ejecting mechanism as claimed in claim 1, wherein the disk receiving apparatus is a slot-in type disk clamping apparatus.

7. The optical drive loader with a manual disk ejecting mechanism as claimed in claim 1, wherein the disk receiving apparatus is a tray.

8. The optical drive loader with a manual disk ejecting mechanism as claimed in claim 1, wherein the driving apparatus is a servo-motor.

* * * * *